United States Patent
Mermelstein et al.

(10) Patent No.: US 10,026,982 B2
(45) Date of Patent: Jul. 17, 2018

(54) CONDENSATE RECOVERY FOR REVERSIBLE SOLID OXIDE FUEL CELLS

(71) Applicant: The Boeing Company, Chicago, IL (US)

(72) Inventors: Joshua M Mermelstein, Laguna Niguel, CA (US); Catherine Cannova, Newport Beach, CA (US)

(73) Assignee: The Boeing Company, Chicago, IL (US)

( * ) Notice: Subject to any disclaimer, the term of this patent is extended or adjusted under 35 U.S.C. 154(b) by 73 days.

(21) Appl. No.: 15/213,628

(22) Filed: Jul. 19, 2016

(65) Prior Publication Data

US 2018/0026290 A1    Jan. 25, 2018

(51) Int. Cl.

| H01M 8/0656 | (2016.01) |
| H01M 8/04746 | (2016.01) |
| H01M 8/04701 | (2016.01) |
| H01M 8/04082 | (2016.01) |
| H01M 8/18 | (2006.01) |

(Continued)

(52) U.S. Cl.
CPC ......... *H01M 8/0656* (2013.01); *C25B 1/10* (2013.01); *H01M 8/04201* (2013.01); *H01M 8/04701* (2013.01); *H01M 8/04753* (2013.01); *H01M 8/186* (2013.01); *H01M 2008/1293* (2013.01); *H01M 2250/10* (2013.01)

(58) Field of Classification Search
CPC ........... H01M 2008/1293; H01M 8/14; H01M 8/141; H01M 8/144; H01M 8/04156; H01M 8/04164; H01M 8/04291; H01M 8/04298; H01M 8/04492; H01M 8/04514; H01M 8/04522; H01M 8/04843; H01M 8/0662; H01M 8/10

See application file for complete search history.

(56) References Cited

U.S. PATENT DOCUMENTS

| 2002/0017463 A1* | 2/2002 | Merida-Donis | ....... C02F 1/4691 204/551 |
| 2003/0207164 A1* | 11/2003 | McElroy | ............... B64C 39/024 244/30 |
| 2004/0224193 A1* | 11/2004 | Mitlitsky | .......... H01M 8/04052 429/411 |

OTHER PUBLICATIONS

U.S. Appl. No. 14/745,250; System and Method for Transitioning a Reversible Solid Oxidefuel Cell System Between Generation and Electrolysis Modes; Joshua M. Mermelstein, Entire document.

(Continued)

*Primary Examiner* — Carlos Barcena

(74) *Attorney, Agent, or Firm* — Duft Bornsen & Fettig LLP

(57) ABSTRACT

Embodiments described herein provide for water reclamation from the exhaust stream of a RSOFC while the RSOFC operates in fuel cell mode. The reclaimed water is stored for use by the RSOFC while in electrolysis mode. An embodiment includes a RSOFC, a condensate tank, a condenser, and a controller. The RSOFC generates electrical power and water vapor by consuming hydrogen gas in the fuel cell mode, and consumes electrical power and water to generate the hydrogen gas in the electrolysis mode. The condenser condenses the water vapor into water, and directs the water to the condensate tank. The controller, responsive to transitioning the RSOFC from the fuel cell mode to the electrolysis mode, supplies the water to the RSOFC from the condensate tank, and supplies the electrical power to the RSOFC to electrolyze the water and to generate the hydrogen gas.

17 Claims, 4 Drawing Sheets

(51) Int. Cl.
*C25B 1/10* (2006.01)
*H01M 8/124* (2016.01)

(56) References Cited

OTHER PUBLICATIONS

U.S. Appl. No. 14/748,979; System and Method for High Pressure, Passive Condensing Ofwater From Hydrogen in a Reversible Solid Oxide Fuel Cell System; Joshua M. Mermelstein, Entire document.
U.S. Appl. No. 14/788,944; Electrical Power Distribution System and Methodfor a Grid-Tied Reversible Solid Oxide Fuel Cell System; Joshua M Mermelstein, Entire document.
U.S. Appl. No. 14/834,062; Process Control for Integrated Hydrogen Storage in Fuel Cellenergy Storage System, Entire document.

* cited by examiner

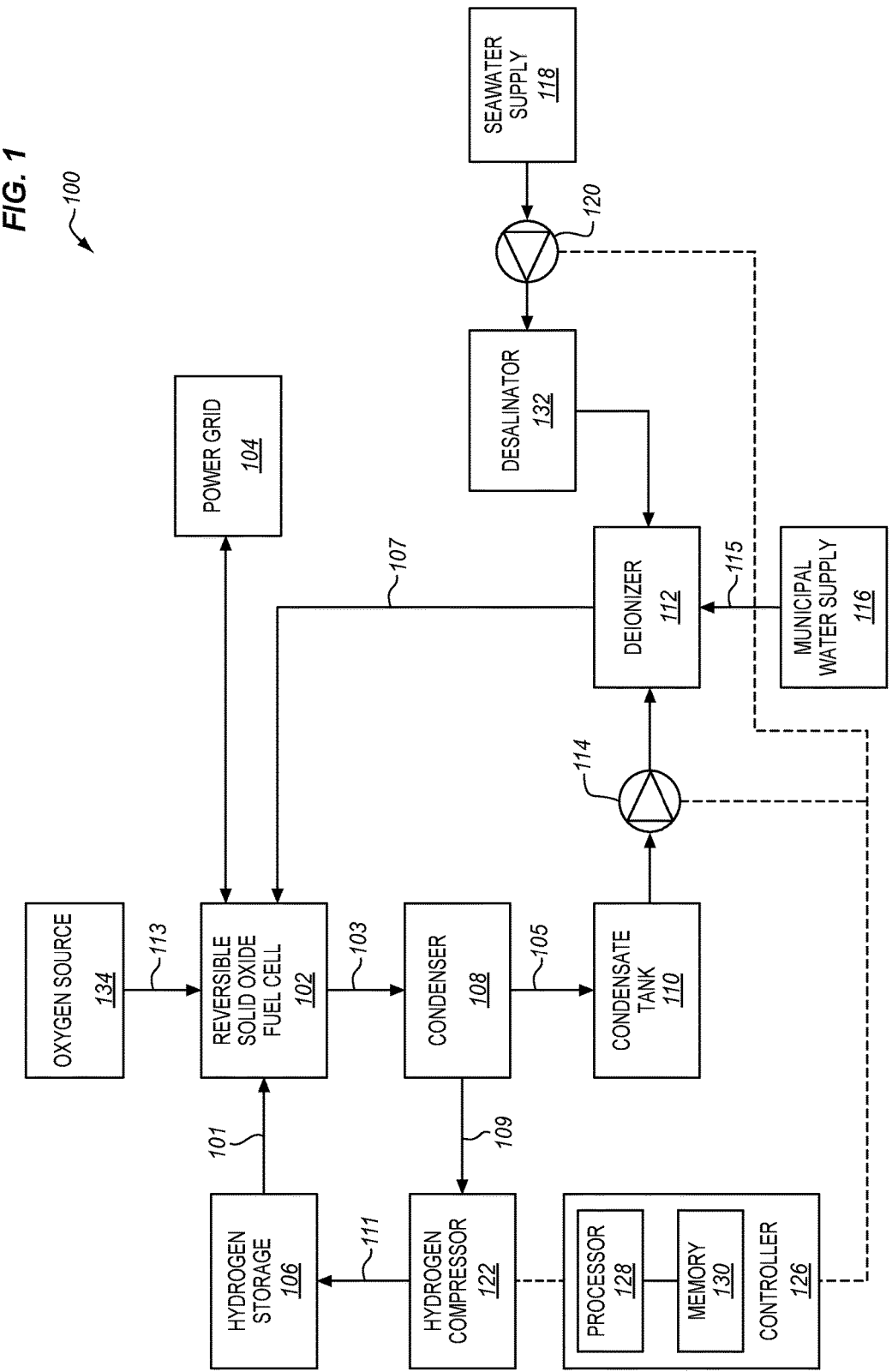

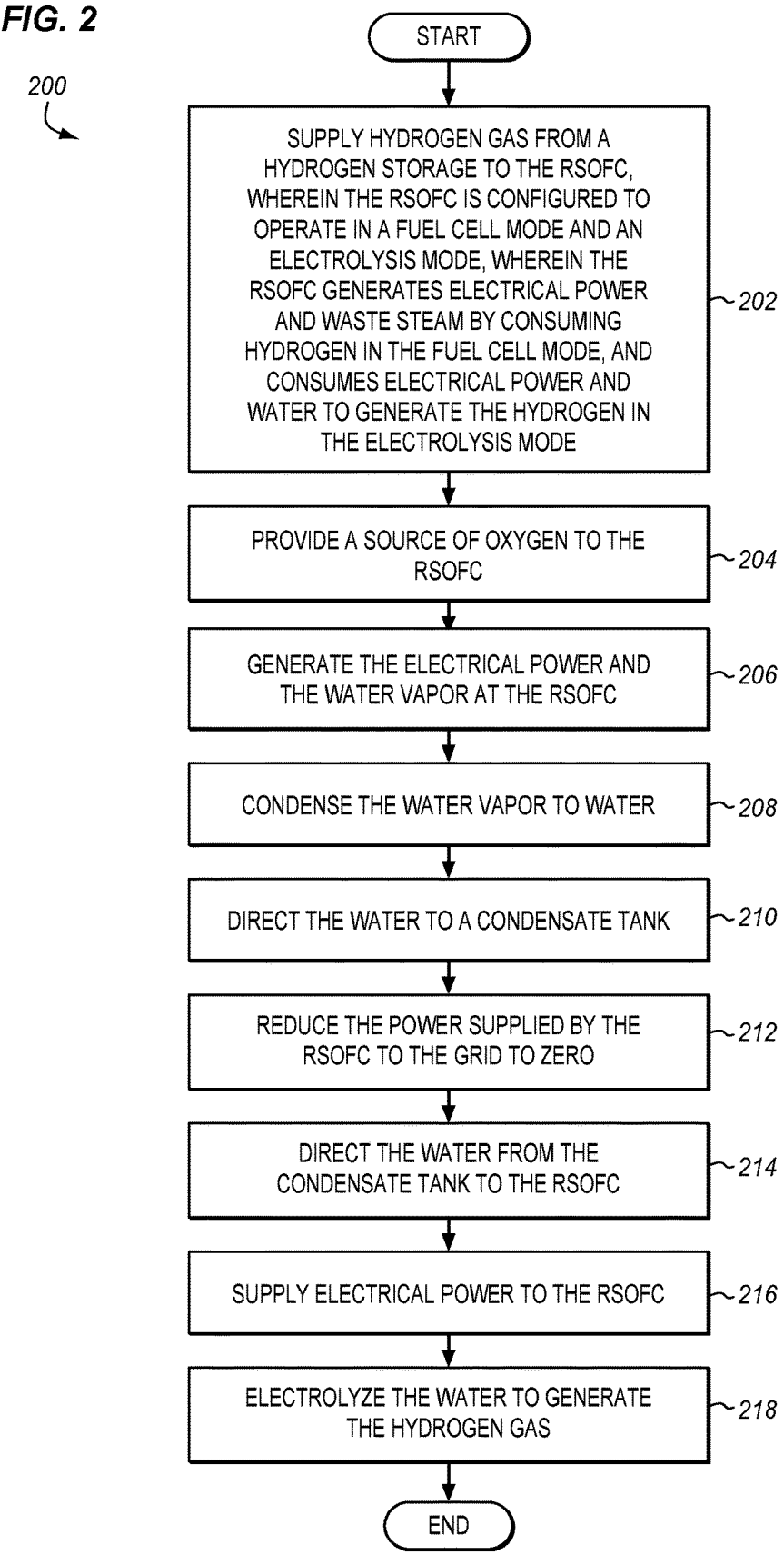

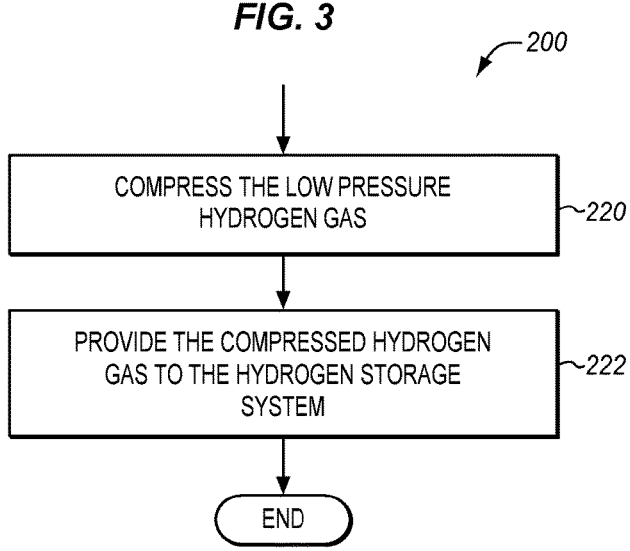
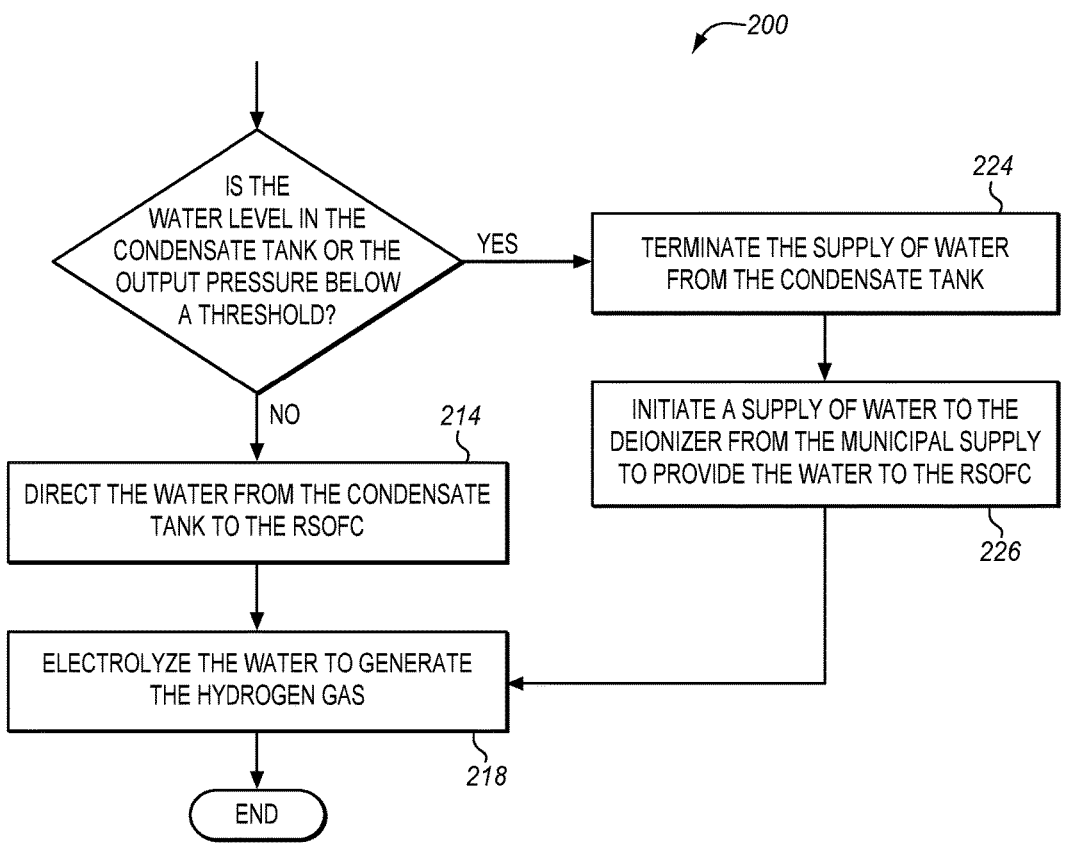

CONDENSATE RECOVERY FOR REVERSIBLE SOLID OXIDE FUEL CELLS

GOVERNMENT RIGHTS

This invention was made with Government support under contract number N39430-14-C-1487 awarded by the US Department of Defense. The government has certain rights in this invention.

FIELD

This disclosure relates to the field of energy storage systems, and in particular, to recovering condensate from the exhaust stream of a reversible solid oxide fuel cell.

BACKGROUND

Fuel cells covert the chemical energy found in a fuel (e.g., hydrogen) into electricity through a chemical reaction with an oxidizer (e.g., oxygen). One example of a fuel cell is a Solid Oxide Fuel Cell (SOFC). Typical SOFCs operate between about 500-1000 degrees Celsius, and the conversion process is exothermic. SOFCs include an anode, a cathode, and an electrolyte between the anode and cathode. The electrolyte may be a solid oxide or a ceramic electrolyte. Hydrogen is introduced to the SOFC at the anode, where the hydrogen atoms are stripped of their electron by a catalyst to produce hydrogen ions. Oxygen is introduced to the SOFC at the cathode, where the oxygen is reduced into oxygen ions. The electrolyte between the anode and the cathode conducts the oxygen ions from the cathode to the anode, where the oxygen ions oxidize the hydrogen ions. In this reaction, a water byproduct is given off along with electrons. The water is typically vented from the SOFC as waste. The electrons produce an electrical current output from the anode, and the electrons return to the cathode to complete the electrical circuit and start this electrochemical process over again.

SOFCs can operate either forward or backward. In the forward mode or fuel cell mode, hydrogen and oxygen supplied to the SOFC is converted into water vapor via oxidation to generate electricity. In the backward mode or electrolysis mode, electricity and water supplied to the SOFC is converted into hydrogen and oxygen via electrolysis. Hydrogen generated in the electrolysis mode is reclaimed for use as a fuel when the SOFC is operated in the fuel cell mode. The oxygen is typically vented as waste. SOFCs that operate in both a fuel cell mode and an electrolysis mode are referred to a Reversible SOFCs (RSOFCs).

Due to their bi-directional conversion abilities, RSOFC systems are being investigated for use in powering and storing energy in grid systems that utilize inconsistent power generation, such as solar and wind. In these environments, RSOFCs can utilize the excess power supplied by solar or wind while operating in electrolysis mode to electrolyze water for storage as hydrogen. During periods where additional power is desired by or when power is not being generated by solar cells or wind turbines, the RSOFC is operated in fuel cell mode to generate electricity using the stored hydrogen.

In electrolysis mode, the RSOFCs utilize a water source and electricity to convert water into hydrogen. Typically, the water source is a municipal water source, which is filtered and de-ionized prior to being used by the RSOFC. In some cases, sea water can be desalinated and de-ionized for use by the RSOFC if a municipal water source is unavailable. Also, a combination of both can be used depending on the reliability of the municipal water source.

Although municipal water sources and/or sea water may be available, there is still a desire to minimize the water consumption of a RSOFC system to reduce its reliance on a source of water. This goal is referred to as a water neutral balance for a RSOFC system.

SUMMARY

Embodiments described herein provide for water reclamation from the exhaust stream of a RSOFC while the RSOFC operates in fuel cell mode. The reclaimed water is stored for use by the RSOFC while the RSOFC operates in electrolysis mode. This enables RSOFC systems to obtain a water neutral or nearly water neutral balance during operation, which reduces their reliance on external sources of water.

One embodiment comprises an apparatus that includes a RSOFC, a condensate tank, a condenser, and a controller. The RSOFC operates in a fuel cell mode and in an electrolysis mode. The RSOFC generates electrical power and water vapor by consuming hydrogen gas in the fuel cell mode, and consumes electrical power and water to generate the hydrogen gas in the electrolysis mode. The condenser condenses the water vapor into water, and directs the water to the condensate tank. The controller, responsive to transitioning the RSOFC from the fuel cell mode to the electrolysis mode, supplies the water to the RSOFC from the condensate tank, and supplies the electrical power to the RSOFC to electrolyze the water and to generate the hydrogen gas.

Another embodiment comprises a method for condensate recovery in a RSOFC system. The method comprises supplying hydrogen gas from a hydrogen storage system of the RSOFC system to a RSOFC of the RSOFC system, where the RSOFC is configured to operate in a fuel cell mode and an electrolysis mode, and where the RSOFC generates electrical power and water vapor by consuming hydrogen in the fuel cell mode, and consumes electrical power and water to generate the hydrogen in the electrolysis mode. The method further comprises generating the electrical power and the water vapor at the RSOFC, condensing the water vapor to water, directing the water to a condensate tank of the RSOFC system, reducing electrical power supplied by the RSOFC to zero, directing the water from the condensate tank to the RSOFC, supplying electrical power to the RSOFC, and electrolyzing the water at the RSOFC to generate the hydrogen gas.

Another embodiment comprises an apparatus that includes a RSOFC, a hydrogen storage, a hydrogen compressor, a condensate tank, a condenser, and a controller. The RSOFC operates in a fuel cell mode and an electrolysis mode, where the RSOFC generates electrical power and water vapor by consuming hydrogen gas in the fuel cell mode, and consumes electrical power and water to generate the hydrogen gas in the electrolysis mode. The hydrogen storage supplies the hydrogen gas to the RSOFC. The hydrogen compressor compresses the hydrogen gas generated by the RSOFC, and provides the compressed hydrogen gas to the hydrogen storage. The condenser, responsive to the RSOFC being in the fuel cell mode, condenses the water vapor into water, and directs the water to the condensate tank. The condenser, responsive to the RSOFC being in the electrolysis mode, directs the hydrogen gas generated by the RSOFC to the hydrogen compressor. The controller, responsive to operating the RSOFC in fuel cell mode, supplies the hydrogen gas from the hydrogen storage to the RSOFC to generate the electrical power and the water vapor. The controller, responsive to operating the RSOFC in electrolysis mode, reduces power supplied by the RSOFC to zero, supplies the water from the condensate tank to the RSOFC, and supplies the electrical power to the RSOFC to electrolyze the water and to generate the hydrogen gas. The controller operates the hydrogen compressor to compress and provide the hydrogen gas generated by the RSOFC to the hydrogen storage.

The above summary provides a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

DESCRIPTION OF THE DRAWINGS

Some embodiments are now described, by way of example only, and with reference to the accompanying drawings. The same reference number represents the same element or the same type of element on all drawings.

FIG. 1 illustrates an energy generation and storage system in an exemplary embodiment.

FIG. 2 is a flow chart of a method for recovering condensate from a RSOFC in an exemplary embodiment.

FIG. 3 illustrates optional steps of the method of FIG. 2 for recovering hydrogen gas generated by a RSOFC in an exemplary embodiment.

FIG. 4 illustrates optional steps of the method of FIG. 2 for supplying a secondary source of water to a RSOFC in an exemplary embodiment.

DESCRIPTION

Figure 5:
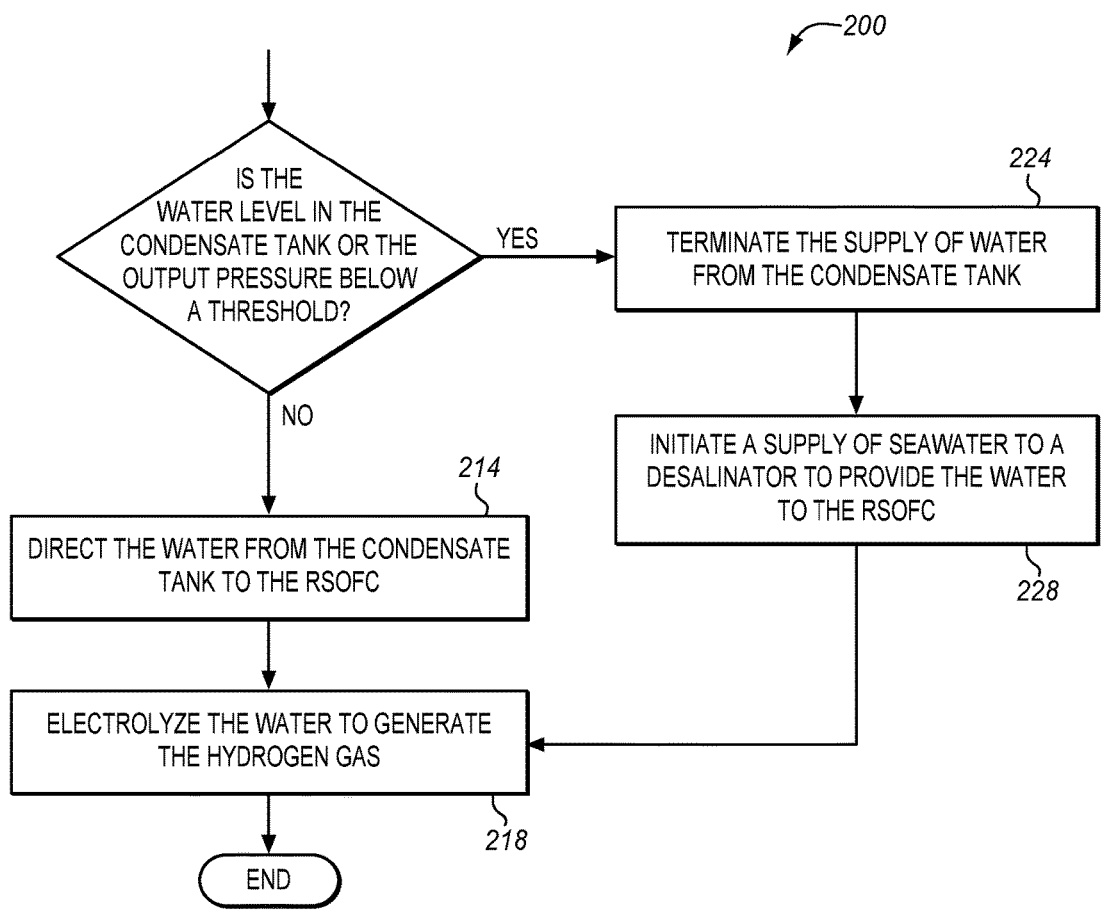
FIG. 5 illustrates optional steps of the method of FIG. 2 for supplying another secondary source of water to a RSOFC in an exemplary embodiment.

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

FIG. 1 illustrates an energy generation and storage system 100 in an exemplary embodiment. In this embodiment, system 100 includes a RSOFC 102, which is capable of operating in electrolysis mode to electrolyze water into hydrogen using electricity fed to RSOFC 102 from a power grid 104. The hydrogen may then be compressed and stored for later use by RSOFC 102 while in fuel cell mode to generate electricity for grid 104. This enables system 100 to operate as an energy storage system for grid 104. RSOFC 102 is also capable of operating in fuel cell mode to oxidize the stored hydrogen and generate electricity for grid 104. In this regard, RSOFC 102 comprises any component, system, or device that is capable of operating to oxidize a fuel to generate electricity, and to electrolyze water to generate the fuel. RSOFC 102 may be referred to as a fuel cell stack or fuel cell system.

In this embodiment, system 100 includes a hydrogen storage system 106, which stores hydrogen gas. One example of hydrogen storage system 106 comprises pressurized tanks of hydrogen gas. Hydrogen storage system 106 is coupled to RSOFC 102 by a fuel line 101, and is used to supply RSOFC 102 with hydrogen as a fuel source when RSOFC 102 operates in fuel cell mode to generate electricity for grid 104. System 100 in this embodiment also includes an oxygen source 134, which provides oxygen to RSOFC 102 via fuel line 113. One example of oxygen source 134 comprises a cathode blower that supplies atmosphere to RSOFC 102. Oxygen source 134 may comprise other elements such as air filters, air pre-heaters, etc., which are not shown in FIG. 1. Oxygen source 134 supplies a source of oxygen to RSOFC 102 when RSOFC 102 operates in fuel cell mode to generate electricity for grid 104.

In this embodiment, RSOFC 102 is coupled to a condenser 108 via an exhaust line 103. When RSOFC 102 operates in fuel cell mode, the hydrogen gas supplied to RSOFC 102 by hydrogen storage system 106 and oxygen is supplied to RSOFC 102 by oxygen source 134. The hydrogen is oxidized at the anode of RSOFC 102, producing water vapor and electricity.

The water vapor generated during operation in fuel cell mode is directed to condenser 108, and the electricity generated during operation in fuel cell mode is supplied to grid 104. Due to the high operating temperatures of RSOFC 102 while in fuel cell mode, the water vapor is typically high temperature dry steam. Condenser 108 converts the water vapor into water, which is directed to a condensate tank 110 via a condenser output line 105. One example of condenser 108 is a heat exchanger that includes a cooling loop in thermal contact with tubes carrying the water vapor generated by RSOFC 102. Condensate tank 110 stores the water for use by RSOFC 102 when RSOFC 102 operates in electrolysis mode. This process is in contrast to simply venting the water vapor to atmosphere.

When RSOFC 102 operates in electrolysis mode, water stored by condensate tank 110 is supplied to a water deionizer 112 by a pump 114. Deionizer 112 deionizes the water stored in condensate tank 110 to prevent the introduction of minerals or salts into RSOFC 102, which can interfere with the electrochemical reactions within RSOFC 102 and/or degrade the performance of RSOFC 102. If the level in condensate tank 110 is low or the output pressure of pump 114 drops below a threshold (e.g., 30 Pounds per Square Inch (PSI)), then water for RSOFC 102 maybe supplied by a connection 115 to a municipal water supply 116 that is in fluid communication with deionizer 112, a seawater supply 118 that is in fluid communication with a desalinator 132, which in turn is in fluid communication with deionizer 112, or a combination of both. Seawater is supplied to desalinator 132 by another pump 120. Desalinator 132 removes salts and minerals, the output of which is fed to deionizer 112. For instance, desalinator 132 may use a reverse osmosis system to remove salts and minerals from seawater provided by seawater supply 118.

After the water is desalinated and/or deionized, water is fed to RSOFC 102 via a water input line 107. Power is supplied to RSOFC 102 via grid 104, which electrolyzes the water and generates hydrogen and oxygen while RSOFC 102 operates in electrolysis mode. The oxygen is vented to atmosphere, and the hydrogen gas is directed to condenser 108 via exhaust line 103. The hydrogen may be cooled by condenser 108. A hydrogen output line 109 supplies the low pressure hydrogen gas from condenser 108 to a hydrogen compressor 122. Hydrogen compressor 122 compresses the low pressure hydrogen gas generated by RSOFC 102 while in electrolysis mode, and supplies high pressure hydrogen gas to hydrogen storage 106 via a hydrogen feed line 111.

System 100 of FIG. 1 has been illustrated with various additional elements removed for clarity. For instance, system 100 may include any number of pumps, valves, vents, transport lines, etc., which have been omitted from FIG. 1 for clarity. However, one of ordinary skill in the art will recognize that the addition of these elements may be subject to design choices, which depend on variables that are beyond the scope of this discussion. Further, various elements illustrated in FIG. 1 may be decomposed into any number of subsystems as a matter of design choice. For instance, condenser 108 may comprise a heat exchanger portion for the condensation of water vapor generated by RSOFC 102, and a hydrogen recovery portion for the capture and transport of hydrogen gas generated by RSOFC 102 to hydrogen compressor 122.

In this embodiment, system 100 also includes a controller 126. Controller 126 comprises any component, system, or device, that is able to coordinate the activities of the elements previously described for system 100. For instance, controller 126 may operate pumps, may direct the application of hydrogen gas to RSOFC 102 while RSOFC 102 is in fuel cell mode, and/or may direct the application of water to RSOFC 102 while RSOFC 102 is in electrolysis mode.

While the specific hardware implementation of controller 126 is subject to design choices, one particular embodiment may include one or more processors 128 communicatively coupled with memory 130. Processor 128 includes any electronic circuits and/or optical circuits that are able to perform functions. For example, processor 128 may perform any functionality described herein for controller 126. Processor 128 may include one or more Central Processing Units (CPU), microprocessors, Digital Signal Processors (DSPs), Application-specific Integrated Circuits (ASICs), Programmable Logic Devices (PLD), control circuitry, etc. Some examples of processors include INTEL® CORE™ processors, Advanced Reduced Instruction Set Computing (RISC) Machines (ARM®) processors, etc.

Memory 130 includes any electronic circuits, and/or optical circuits, and/or magnetic circuits that are able to store data. For instance, memory 130 may be used to store control variables for RSOFC 102, instructions that execute on processor 128, etc. Memory 130 may include one or more volatile or non-volatile Dynamic Random Access Memory (DRAM) devices, FLASH devices, volatile or non-volatile Static RAM devices, magnetic disk drives, Solid State Disks (SSDs), etc. Some examples of non-volatile DRAM and SRAM include battery-backed DRAM and battery-backed SRAM.

Consider that system 100 is ready to be placed into service. In the following discussion, assume that RSOFC 102 is at room temperature. FIG. 2 is a flow chart of a method 200 for recovering condensate from a RSOFC in an exemplary embodiment. The steps of method 200 will be discussed with respect to system 100, although one of ordinary skill in the art will recognize that method 200 may be performed by other systems not shown. Also, method 200 may include other steps not shown, and the steps may be performed in an alternate order.

Initially, RSOFC 102 may be heated to an operating temperature, such as between 500 and 1000 degrees Celsius. As discussed previously, the oxidation process that occurs at RSOFC 102 is exothermic while in fuel cell mode. Typically the temperature of RSOFC 102 is controlled using a cathode blower (not shown in FIG. 1 as part of oxygen source 134), which supplies oxygen to the cathode of RSOFC 102. The cathode blower can be used to increase the flow rate of atmosphere through the cathode of RSOFC 102, which increases the heat removal rate from RSOFC 102 and reduces the temperature of RSOFC 102. The cathode blower can also be used to decrease the flow rate of atmosphere through the cathode of RSOFC 102, which decreases the heat removal rate from RSOFC 102 and increases the temperature of RSOFC 102. RSOFC 102 may also be heated to an operating temperature using electrical heaters (not shown).

While in fuel cell mode, hydrogen gas is supplied to the anode of RSOFC 102 via hydrogen storage system 106 (see step 202 of FIG. 2). For instance, processor 128 of controller 126 may open a feed valve located along feed line 101 (feed valve is not shown) to allow hydrogen gas to flow into RSOFC 102. RSOFC 102 is also supplied with oxygen at the cathode (see step 204). For instance, processor 128 may direct oxygen source 134 (e.g., a cathode blower) to supply atmosphere to the cathode. With hydrogen and oxygen supplied to RSOFC 102, RSOFC 102 electrochemically converts the hydrogen and oxygen into water vapor and electricity. The water vapor is fed to condenser 108 via exhaust line 103, and the electricity is fed to grid 104 (see step 206). Condenser 108 condenses the water vapor into liquid water (see step 208). For instance, condenser 108 may include a heat exchanger (not shown in FIG. 1) that utilizes a cooling loop that removes heat from the high temperature water vapor that is fed to condenser 108, allowing the water vapor to condense into liquid water. Condenser 108 directs the liquid water to condensate tank 110 through condenser output line 105 (see step 210). This process continues while RSOFC 102 operates in fuel cell mode unless condensate tank 110 is full (e.g., if processor 128 determines that a level sensor in condensate tank 110, not shown, indicates that condensate tank 110 has a level above a threshold).

At some point, it may be desirable to operate system 100 to store energy for grid 104. For instance, the electrical demand on grid 104 may be less than the energy supplied to grid 104 by other electrical sources (e.g., solar stations, wind stations, etc.). In this case, system 100 is used to store energy for grid 104. To do so, processor 128 reduces the power supplied by RSOFC 102 to grid 104 to zero (see step 212). Processor 128 directs the condensate from condensate tank 110 to RSOFC 102. To do so, processor 128 activates pump 114 to supply the condensate to deionizer 112, which deionizes the condensate. In other embodiments, the water may be gravity fed from condensate tank 110 to deionizer 112. The condensate, now deionized, is supplied by deionizer 112 to RSOFC 102 via water input line 107 (see step 214). Processor 128 then configures RSOFC 102 to receive electrical power from grid 104 (see step 216). For example, a bi-directional power converter may be used to electrically couple RSOFC 102 to grid 104, which can be configured to vary the direction of electrical power transferred between RSOFC 102 and grid 104. Once RSOFC 102 is in electrolysis mode, processor 128 reduces the supply of hydrogen to RSOFC 102 to zero. RSOFC 102, electrically powered by grid 104 and supplied with deionized condensate, electrolyzes the condensate and generates hydrogen and oxygen gas (see step 218). In this embodiment, the oxygen is vented to atmosphere, but in other embodiments, the oxygen may be compressed and stored for re-use. FIG. 3 illustrates optional steps of method 200 for recovering the hydrogen gas in an exemplary embodiment. The low pressure hydrogen gas is supplied to condenser 108, which may cool and provide the low pressure hydrogen gas to hydrogen compressor 122 via hydrogen output line 109. Hydrogen compressor 122 compresses the low pressure hydrogen gas into a high pressure (see step 220), and supplies the high pressure hydrogen gas to hydrogen storage 106 for re-use when system 100 is operated in fuel cell mode (see step 222).

Obtaining a water neutral balance for a RSOFC system is desirable, because it eliminates or reduces the water used by the RSOFC system by external sources. In some cases, municipal water or other secondary sources of water may not be available at the installation site where the RSOFC system is placed in service. Thus, it is desirable to achieve a water neutral balance where possible. In some cases, a water neutral balance may not be achievable if system 100 operates in electrolysis mode for long periods of time. For instance, the water stored in condensate tank 110 may be exhausted due to the finite storage capabilities of condensate tank 110, resulting in the water level in condensate tank 110 becoming too low to supply water to RSOFC 102. Or, the output pressure from pump 114 may fall below a threshold. Thus, it would be desirable to have other secondary sources of water available for electrolysis at RSOFC 102.

FIG. 4 illustrates optional steps of method 200 for supplying a secondary source of water to RSOFC 102 in an exemplary embodiment. During electrolysis mode, processor 128 monitors the level of water that remains in condensate tank 110 and/or the output pressure of pump 114. If processor 128 determines that the water level and the pump output pressure are above a threshold, then processor 128 continues to operate pump 114 to supply water from condensate tank 110 to RSOFC 102 (see steps 216 and 218 in FIG. 4, previously described). However, if processor 128 determines that the water level in condensate tank 110 is below the threshold or the output pressure of pump 114 is below a threshold (e.g., 30 PSI), then processor 128 terminates the activity of pump 114, which terminates the supply of water to RSOFC 102 from condensate tank 110 (see step 224). Processor 128 initiates a supply of water from municipal water supply 116 to deionizer 112, which supplies water to RSOFC 102 instead of the water from condensate tank 110 (see step 226).

Although a municipal water supply has been described as a secondary source of water for RSOFC 102 during electrolysis mode, other secondary sources of water may also exist. FIG. 5 illustrates optional steps of method 200 for supplying another secondary source of water to RSOFC 102 in an exemplary embodiment. During electrolysis mode, processor 128 monitors the level of water that remains in condensate tank 110. If processor 128 determines that the water level is above a threshold and the output pressure of pump 114 is above a threshold (e.g., 30 PSI), then processor 128 continues to operate pump 114 to supply water from condensate tank 110 to RSOFC 102 (see steps 216 and 218 in FIG. 5, previously described). However, if processor 128 determines that the water level in condensate tank 110 is below the threshold or the output pressure from pump 114 is below a threshold (e.g., 30 PIS), then processor 128 terminates the activity of pump 114, which terminates the supply of water to RSOFC 102 from condensate tank 110 (see step 224). Processor 128 initiates a supply of seawater from seawater supply 118 to desalinator 132, which supplies water to RSOFC 102 via deionizer 112 instead of the water from condensate tank 110 (see step 228). Although only two secondary sources of water have been shown, other secondary sources of water may be utilized as desired.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof.

The invention claimed is:

1. An apparatus comprising:
    a Reversible Solid Oxide Fuel Cell (RSOFC) configured to operate in a fuel cell mode and in an electrolysis mode, wherein the RSOFC generates electrical power and water vapor by consuming hydrogen gas in the fuel cell mode, and consumes electrical power and water to generate the hydrogen gas in the electrolysis mode;
    a condensate tank;
    a deionizer in fluid communication between the condensate tank and the RSOFC that is configured to deionize the water prior to supplying the water to the RSOFC;
    a condenser configured to condense the water vapor into water, and to direct the water to the condensate tank; and
    a controller, responsive to transitioning the RSOFC from the fuel cell mode to the electrolysis mode, is configured to supply the water to the RSOFC from the condensate tank, and to supply the electrical power to the RSOFC to electrolyze the water and to generate the hydrogen gas.

2. The apparatus of claim 1 further comprising:
    a connection to a municipal water supply that is coupled to the deionizer;
    wherein the controller, responsive to determining that a water level in the condensate tank is below a threshold, is configured to terminate the supply of water to the RSOFC from the condensate tank, and to initiate a supply of water to the deionizer from the municipal water supply to provide the water to the RSOFC.

3. The apparatus of claim 1 further comprising:
a desalinator in fluid communication with the deionizer that is configured to desalinate seawater prior to supplying the seawater to the deionizer;
wherein the controller, responsive to determining that a water level in the condensate tank is below a threshold, is configured to terminate the supply of water to the RSOFC from the condensate tank, and to initiate a supply of seawater to the desalinator to provide the water to the RSOFC to provide the water to the RSOFC.

4. The apparatus of claim 1 further comprising:
a pump in fluid communication between the condensate tank and the deionizer; and
a connection to a municipal water supply that is coupled to the deionizer;
wherein the controller, responsive to determining that an output pressure from the pump is below a threshold, is configured to terminate the supply of water to the RSOFC from the condensate tank, and to initiate a supply of water to the deionizer from the municipal water supply to provide the water to the RSOFC.

5. The apparatus of claim 1 further comprising:
a pump in fluid communication between the condensate tank and the deionizer; and
a desalinator in fluid communication with the deionizer that is configured to desalinate seawater prior to supplying the seawater to the deionizer;
wherein the controller, responsive to determining that an output pressure from the pump is below a threshold, is configured to terminate the supply of water to the RSOFC from the condensate tank, and to initiate a supply of seawater to the desalinator to provide the water to the RSOFC.

6. The apparatus of claim 1 further comprising:
a hydrogen storage system; and
a hydrogen compressor in fluid communication between the hydrogen storage system and the RSOFC;
wherein the controller, responsive to transitioning the RSOFC to the electrolysis mode, is configured to direct the hydrogen compressor to compress the hydrogen gas generated by the RSOFC, and to provide the compressed hydrogen gas to the hydrogen storage system.

7. The apparatus of claim 6 wherein:
the controller, responsive to transitioning the RSOFC to the fuel cell mode, is configured to direct the hydrogen compressor to terminate compression, and to direct the hydrogen storage system to supply the hydrogen gas to the RSOFC.

8. A method for condensate recovery in a Reversible Solid Oxide Fuel Cell (RSOFC) system, the method comprising:
supplying hydrogen gas from a hydrogen storage system of the RSOFC system to a RSOFC of the RSOFC system, wherein the RSOFC is configured to operate in a fuel cell mode and an electrolysis mode, wherein the RSOFC generates electrical power and water vapor by consuming hydrogen in the fuel cell mode, and consumes electrical power and water to generate the hydrogen in the electrolysis mode;
generating the electrical power and the water vapor at the RSOFC;
condensing the water vapor to water;
directing the water to a condensate tank of the RSOFC system;
reducing electrical power supplied by the RSOFC to zero;
applying the water from the condensate tank to a deionizer to deionize the water;
directing the deionized water from the deionizer to the RSOFC;
supplying electrical power to the RSOFC; and
electrolyzing the water at the RSOFC to generate the hydrogen gas.

9. The method of claim 8 further comprising:
determining that a water level in the condensate tank is below a threshold;
terminating the supply of water to the RSOFC from the condensate tank; and
initiating a supply of water to the deionizer from a municipal water supply to provide the water to the RSOFC.

10. The method of claim 8 further comprising:
determining that a water level in the condensate tank is below a threshold;
terminating the supply of water to the RSOFC from the condensate tank; and
initiating a supply of seawater to a desalinator to provide the water to the RSOFC.

11. The method of claim 8 further comprising:
determining that an output pressure from a pump supplying water from the condensate tank is below a threshold;
terminating the supply of water to the RSOFC from the condensate tank; and
initiating a supply of water to the deionizer from a municipal water supply to provide the water to the RSOFC.

12. The method of claim 8 further comprising:
determining that an output pressure from a pump supplying water from the condensate tank is below a threshold;
terminating the supply of water to the RSOFC from the condensate tank; and
initiating a supply of seawater to a desalinator to provide the water to the RSOFC.

13. The method of claim 8 further comprising:
compressing the hydrogen gas;
supplying the compressed hydrogen gas to the hydrogen storage system.

14. The method of claim 13 further comprising:
transitioning the RSOFC to the fuel cell mode;
terminating compression of the hydrogen gas;
supplying the hydrogen gas to the RSOFC from the hydrogen storage system.

15. An apparatus comprising:
a Reversible Solid Oxide Fuel Cell (RSOFC) configured to operate in a fuel cell mode and an electrolysis mode, wherein the RSOFC generates electrical power and water vapor by consuming hydrogen gas in the fuel cell mode, and consumes electrical power and water to generate the hydrogen gas in the electrolysis mode;
a hydrogen storage configured to supply the hydrogen gas to the RSOFC;
a hydrogen compressor configured to compress hydrogen gas generated by the RSOFC, and to provide the compressed hydrogen gas to the hydrogen storage;
a condensate tank;
a deionizer in fluid communication between the condensate tank and the RSOFC that is configured to deionize the water prior to supplying the water to the RSOFC;
a condenser configured, responsive to the RSOFC being in the fuel cell mode, to condense the water vapor into water, and to direct the water to the condensate tank;

the condenser configured, responsive to the RSOFC being in the electrolysis mode, to direct the hydrogen gas generated by the RSOFC to the hydrogen compressor; and a controller, responsive to operating the RSOFC in fuel cell mode, configured to supply the hydrogen gas from the hydrogen storage to the RSOFC to generate the electrical power and the water vapor;

the controller, responsive to operating the RSOFC in electrolysis mode, is configured to reduce power supplied by the RSOFC to zero, to supply the deionized water from the deionizer to the RSOFC, and to supply the electrical power to the RSOFC to electrolyze the water and to generate the hydrogen gas;

the controller configured to operate the hydrogen compressor to compress and provide the hydrogen gas generated by the RSOFC to the hydrogen storage.

16. The apparatus of claim 15 further comprising:

a connection to a secondary water supply that is coupled to the deionizer;

wherein the controller, responsive to determining that a water level in the condensate tank is below a threshold, is configured to terminate the supply of water to the RSOFC from the condensate tank, and to initiate a supply of water to the deionizer from the secondary water supply to provide the water to the RSOFC.

17. The apparatus of claim 15 further comprising:

a connection to a secondary water supply that is coupled to the deionizer; and a pump in fluid communication between the condensate tank and the deionizer;

wherein the controller, responsive to determining that an output pressure from the pump is below a threshold, is configured to terminate the supply of water to the RSOFC from the condensate tank, and to initiate a supply of water to the deionizer from the secondary water supply to provide the water to the RSOFC.

* * * * *